United States Patent [19]
Flammang

[11] Patent Number: 5,430,928
[45] Date of Patent: Jul. 11, 1995

[54] METHOD FOR FIXING A GRID OR PERFORATED PLATE TO THE BOTTOM OF A COOKING VESSEL

[75] Inventor: Denis Flammang, Rumilly, France
[73] Assignee: SEB S.A., Selongey, France
[21] Appl. No.: 205,269
[22] Filed: Mar. 3, 1994
[30] Foreign Application Priority Data
  Mar. 3, 1993 [FR] France .................. 93 02461
[51] Int. Cl.$^6$ .............................. B23P 19/04
[52] U.S. Cl. .................. 29/460; 29/505; 29/527.2; 29/DIG. 37; 220/912
[58] Field of Search ......... 29/460, 505, 521, DIG. 37, 29/514, 527.2; 220/912; 72/412, 414

[56] References Cited
U.S. PATENT DOCUMENTS

| | | | |
|---|---|---|---|
| 1,730,034 | 10/1929 | Faulk | 220/912 |
| 2,290,554 | 7/1942 | Hack | 29/505 |
| 3,495,735 | 2/1970 | Ulam et al. | |

FOREIGN PATENT DOCUMENTS

| | | |
|---|---|---|
| 509860 | 10/1992 | European Pat. Off. . |
| 510546 | 10/1992 | European Pat. Off. . |
| 515705 | 12/1992 | European Pat. Off. . |
| 2643806 | 9/1990 | France .................. 220/912 |
| 2674463 | 10/1992 | France . |
| 1440973 | 3/1969 | Germany . |
| WO87/04911 | 8/1987 | WIPO . |

Primary Examiner—David P. Bryant
Attorney, Agent, or Firm—Young & Thompson

[57] ABSTRACT

In order to fix a perforated plate (2) to the bottom (1) of a vessel, the plate is fixed by closed-die forging, in particular by cold striking so as to make the metal of the bottom (1) penetrate into the openings (4) in the plate (2). At the same time as the closed-die forging operation, a series of reliefs (5) is formed on the surface of the perforated plate (2) as well as on the surface of the bottom (1) of the vessel.

12 Claims, 2 Drawing Sheets

`5,430,928`

METHOD FOR FIXING A GRID OR PERFORATED PLATE TO THE BOTTOM OF A COOKING VESSEL

FIELD OF THE INVENTION

The present invention relates to a method for fixing a grid or perforated plate to the bottom of a cooking vessel, such as a frying pan or saucepan, for the purpose of improving the mechanical properties of said bottom.

BACKGROUND OF THE INVENTION

Such a method is already described in French Patent No. 2,674,463 in the name of the applicant company.

According to this method, this grid or perforated plate is fixed by closed-die forging, in particular by cold striking so as to make the metal of said bottom penetrate into the openings in said grid or perforated plate.

By virtue of this method, the perforated plate or grid is firmly embedded into the metal of the bottom of the cooking vessel.

The perforated plate or grid is preferably made of steel, whereas the metal of the cooking vessel is preferably made of aluminum.

Because the grid or perforated plate made of hard metal is embedded in the relatively soft metal of the vessel, the mechanical strength of the bottom of the vessel is considerably improved as regards the various mechanical and thermal stresses to which it is likely to be subjected.

After closed-die forging of the grid or of the perforated plate into the metal of the bottom of the vessel, the plane surface of said bottom usually receives a coating made of non-stick material, such as polytetrafluoroethylene (PTFE) or a coating made of enamel.

Such a coating, especially when it is a PTFE one, is relatively sensitive to scratches due in particular to the use of cutting tools having a sharp-edged blade.

The object of the present invention is especially to overcome the hereinabove drawback.

SUMMARY OF THE INVENTION

According to the invention, the method for fixing a grid or perforated plate made of hard metal to the bottom of a cooking vessel, in which the grid or perforated plate is fixed by closed-die forging, in particular by cold striking so as to make the metal of said bottom penetrate into the openings in said grid or perforated plate, is one in which, after or at the same time as the closed-die forging operation, a series of reliefs is formed on the surface of the grid or perforated plate as well as on the surface of the bottom of the vessel.

Reliefs are thus provided over the entire surface of the bottom of the vessel. These reliefs provide the bottom of the vessel with several technical effects.

Firstly, these reliefs increase the contact area between the bottom and the coating applied subsequently, which improves the adhesion of the latter.

What is more, these reliefs immediately improve the resistance of the coating as regards scratches, because the sharp edge of the blade likely to be applied against the coating only reaches the peaks of the reliefs, with the result that the scratches, instead of being long, are limited to practically invisible points.

In addition, the closed-die forging of reliefs onto that surface of the bottom which has the grid or perforated plate improves the anchoring of the latter in the metal of said bottom.

Furthermore, when the plate or grid is made of steel and the bottom of the vessel is made of aluminum, this plate or grid confers on the aluminum elasticity properties due to the steel.

Since the aluminum of the bottom of the vessel has no elasticity, this bottom tends to deform in an irreversible manner, which has the drawback of considerably decreasing the surface area for heat exchange between the bottom and a cooking hotplate. This irreversible deformation is prevented by virtue of the elasticity of the bottom due to the presence of the grid or perforated plate made of elastic metal.

Other particular features and advantages of the invention will further appear in the description hereinbelow.

BRIEF DESCRIPTION OF THE DRAWING

In the appended drawings, given by way of non-limiting examples.

DETAILED DESCRIPTION OF THE INVENTION

Figure 1:
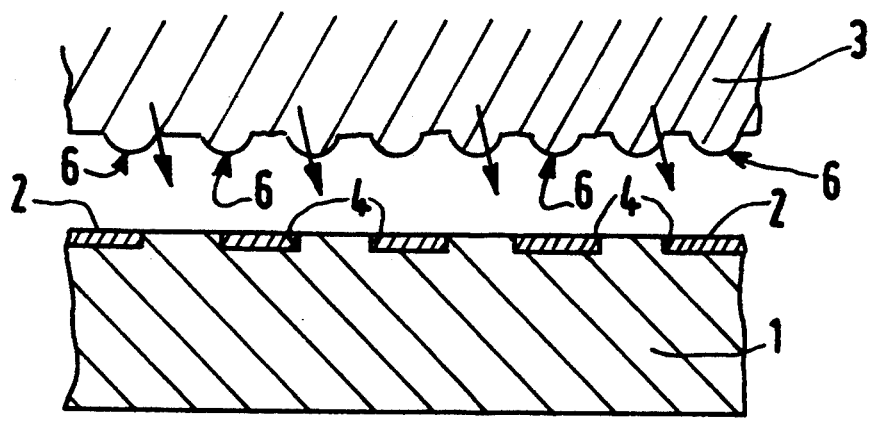
FIG. 1 is a sectional diagram of the bottom of a cooking vessel and of a die used for closed-die forging a perforated plate onto the metal of said bottom.
Figure 2:
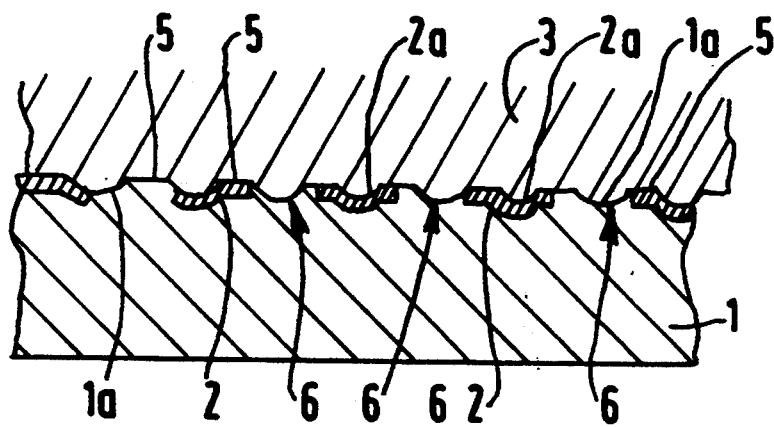
FIG. 2 is a similar diagram to FIG. 1, showing the actual closed-die forging operation.

As illustrated by FIGS. 1 and 2, in the method for fixing a grid or perforated plate 2 made of hard metal, such as steel, to the bottom 1 of a cooking vessel made of aluminum, for example, this grid or perforated plate is fixed by closed-die forging, in particular by cold striking, by means of a die (not shown), so as to make the metal of said bottom 1 penetrate into the openings 4 in said grid or perforated plate 2.

In accordance with the invention, after (as shown in FIG. 1) or preferably at the same time as the closed-die forging operation (as shown in FIG. 2), a series of reliefs 5 is formed (see FIG. 2) on the surface 2a of the grid or perforated plate 2 as well as on the surface 1a of the bottom 1 of the vessel.

For this purpose, the die 3 used for fixing the grid or perforated plate 2 has, on its surface, a series of reliefs 6 complementary to those which it is wished to form on the surface 1a of the bottom 1 of the vessel.

In the example shown, the reliefs 5 are formed on the inside surface 1a of the bottom 1 of the vessel.

Figure 3:
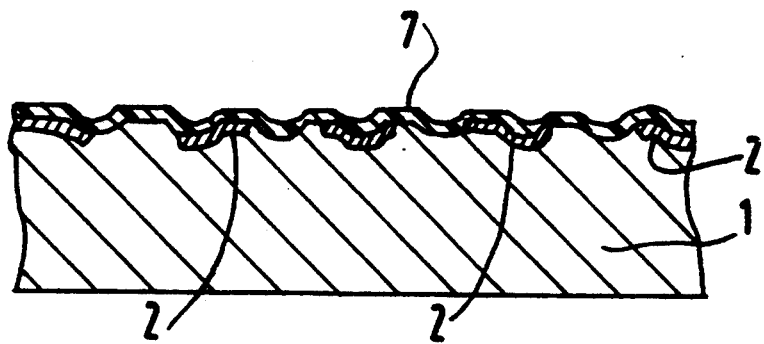
FIG. 3 is a sectional diagram showing the reliefs which are closed-die forged onto the surface of the bottom of the vessel, this surface being covered with a non-stick layer.

As illustrated in FIG. 3, the surface of the bottom 1 of the vessel is covered subsequently with a layer 7 of non-stick polymer, such as PTFE.

The distribution and shape of the reliefs 5 are such that, when the sharp edge of a knife blade is moved over the non-stick coating 7, said sharp edge comes into contact only with the peaks of the reliefs 5. The formation of long visible scratches leading to rapid deterioration of the non-stick coating is thus prevented.

Figure 4:
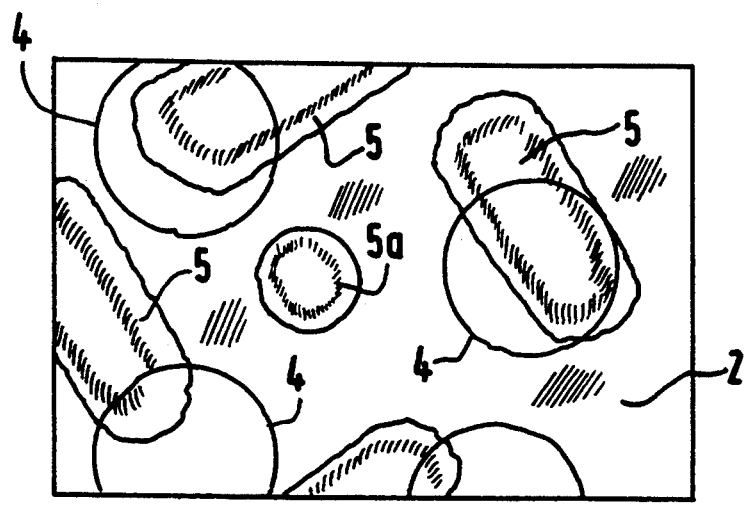
FIG. 4 is a partial plan view of the surface of the bottom, obtained after closed-die forging of the reliefs.
Figure 5:
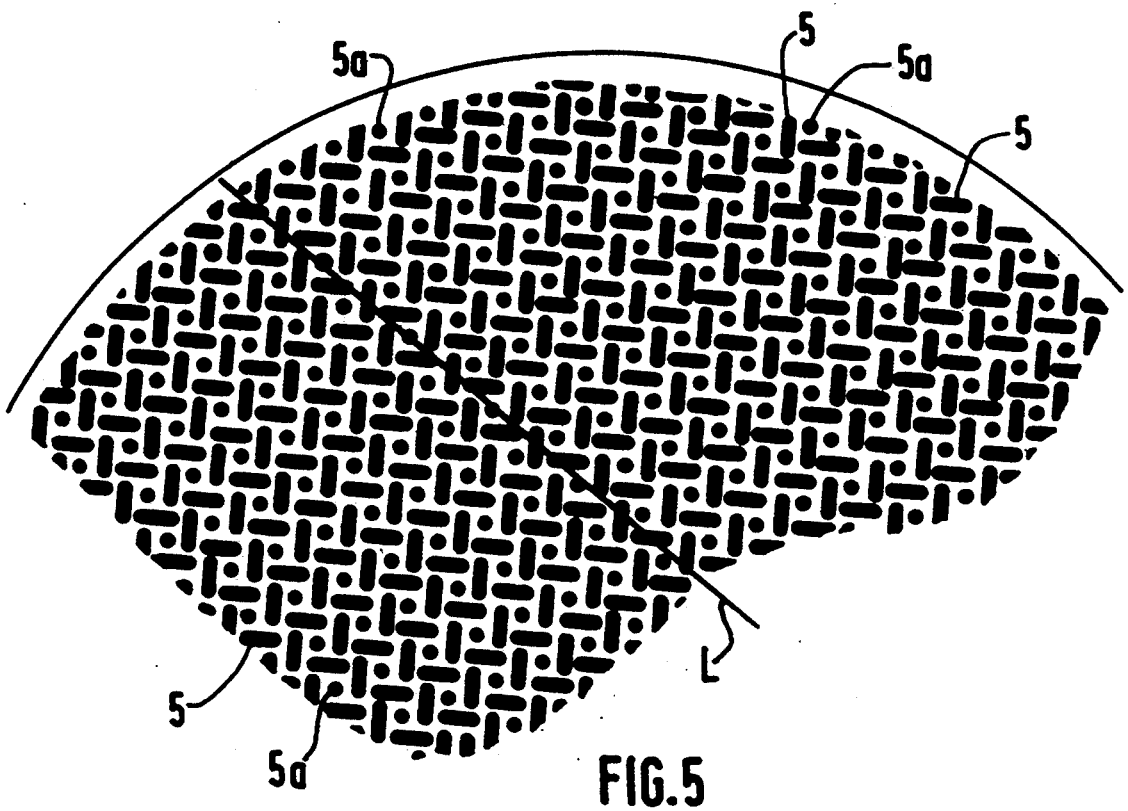
FIG. 5 is a partial plan view, on a smaller scale, of the surface of the bottom of the vessel.

In the example of FIGS. 4 and 5, reliefs 5 and 5a, which are closed-die forged onto the surface of the bottom of the vessel are constituted by elongate reliefs 5 which flank point-like reliefs 5a.

The elongate reliefs 5 have a length equal to 5-6 mm and a width equal to 2-3 mm.

The point-like reliefs 5a have a diameter equal to 1-2 mm.

The distance between the reliefs 5, 5a does not exceed 3 mm.

It is found that if the sharp edge of a blade is applied along any line L (see FIG. 5) against the surface of the bottom of the vessel, the sharp edge of the blade will encounter only the peaks of the reliefs 5, 5a. As a result, the sharp edge of the blade will be able to form no continuous scratch on the surface of the bottom, but only invisible point-like scratches which are not likely to degrade the non-stick coating 7.

Moreover, the reliefs 5, 5a enable the contact area between the food and the inside bottom of the cooking vessel to be decreased, which decrease enables the risk of this food sticking to be yet further minimized.

In FIG. 4, it is seen that the reliefs 5 are formed not only on the solid parts of the perforated plate 2, but also on the surface of the aluminum which appears in the openings 4 in the perforated plate 2.

By virtue of the closed-die forging of the reliefs 5, 5a, which is carried out simultaneously with the closed-die forging of the perforated plate into the metal of the bottom of the vessel, the continuity between the metal of the bottom and the perforated plate 2 is improved, especially in the region of the openings 4 in the latter.

Of course, the invention is not limited to the exemplary embodiments which have just been described, and numerous modifications may be made to these without departing from the scope of the invention.

Thus, the shape of the reliefs 5, 5a could be different from that illustrated in the drawings.

I claim:

1. A method for fixing a grid made of hard metal to the bottom of a metal cooking vessel, which comprises: fixing the grid to the bottom by closed-die forging so as to make metal of said bottom penetrate into openings in said grid, and forming a series of reliefs both on surfaces of the grid and the bottom of the cooking vessel.

2. The method as recited in claim 1, wherein the step of fixing the grid is carried out with a die having on one surface, a series of reliefs complementary to those which it is wished to form on the bottom of the cooking vessel.

3. The method as recited in claim 1, wherein the step of forming a series of reliefs is carried out at the same time as the closed-die forging operation.

4. The method as recited in claim 1, wherein the reliefs are formed on an inside surface of the bottom of the cooking vessel.

5. The method as recited in claim 4, further comprising, subsequent to said fixing and forming steps, coating the inside surface of the bottom of the cooking vessel with a layer of non-stick polymer.

6. The method as recited in claim 5, wherein the distribution and shape of the reliefs are such that, when a sharp edge of a knife blade is moved over the non-stick coating, said sharp edge comes into contact only with peaks of the reliefs.

7. A method for fixing a perforated plate made of hard metal to the bottom of a metal cooking vessel, which comprises: fixing the perforated plate to the bottom by closed-die forging so as to make metal of said bottom penetrate into openings in said perforated plate, and forming a series of reliefs both on surfaces of the perforated plate and the bottom of the cooking vessel.

8. The method as recited in claim 7, wherein the step of fixing the perforated plate is carried out with a die having on one surface, a series of reliefs complementary to those which it is wished to form on the bottom of the cooking vessel.

9. The method as recited in claim 7, wherein the step of forming a series of reliefs is carried out at the same time as the closed-die forging operation.

10. The method as recited in claim 7, wherein the reliefs are formed on an inside surface of the bottom of the cooking vessel.

11. The method as recited in claim 10, further comprising, subsequent to said fixing and forming steps, coating the inside surface of the bottom of the cooking vessel with a layer of non-stick polymer.

12. The method as recited in claim 11, wherein the distribution and shape of the reliefs are such that, when a sharp edge of a knife blade is moved over the non-stick coating, said sharp edge comes into contact only with peaks of the reliefs.

* * * * *